(12) United States Patent
Zhou (10) Patent No.: US 9,235,624 B2
(45) Date of Patent: Jan. 12, 2016

(54) DOCUMENT SIMILARITY EVALUATION SYSTEM, DOCUMENT SIMILARITY EVALUATION METHOD, AND COMPUTER PROGRAM

(71) Applicant: NEC CORPORATION, Minato-ku, Tokyo (JP)

(72) Inventor: Wenqi Zhou, Tokyo (JP)

(73) Assignee: NEC CORPORATION, Tokyo (JP)

( * ) Notice: Subject to any disclaimer, the term of this patent is extended or adjusted under 35 U.S.C. 154(b) by 478 days.

(21) Appl. No.: 13/672,794

(22) Filed: Nov. 9, 2012

(65) Prior Publication Data

US 2013/0191410 A1 Jul. 25, 2013

(30) Foreign Application Priority Data

Jan. 19, 2012 (JP) ................................. 2012-008691

(51) Int. Cl.
*G06F 17/30* (2006.01)
*G06F 17/22* (2006.01)

(52) U.S. Cl.
CPC .... *G06F 17/30495* (2013.01); *G06F 17/30675* (2013.01); *G06F 17/2211* (2013.01)

(58) Field of Classification Search
None
See application file for complete search history.

(56) References Cited

U.S. PATENT DOCUMENTS

| | | | | |
|---|---|---|---|---|
| 5,926,812 A * | 7/1999 | Hilsenrath | .......... | G06F 17/3071 707/737 |
| 5,943,669 A * | 8/1999 | Numata | ............ | G06F 17/30707 1/1 |
| 6,493,709 B1 * | 12/2002 | Aiken | ................. | G06F 17/2211 1/1 |
| 6,658,626 B1 * | 12/2003 | Aiken | ................. | G06F 17/2211 707/E17.039 |
| 6,978,419 B1 * | 12/2005 | Kantrowitz | ................... | 715/209 |
| 8,140,526 B1 * | 3/2012 | Zhang | ............... | G06F 17/30687 707/730 |
| 8,316,292 B1 * | 11/2012 | Verstak | ............... | G06F 17/2211 715/229 |
| 8,874,663 B2 * | 10/2014 | Stein | ................. | G06F 17/30675 709/203 |
| 2003/0101177 A1 * | 5/2003 | Matsubayashi | ..... | G06F 17/3069 1/1 |
| 2004/0243602 A1 * | 12/2004 | Shiiyama | .......... | G06F 17/30256 1/1 |
| 2005/0010863 A1 * | 1/2005 | Zernik | ................ | G06F 17/2211 715/229 |
| 2005/0060643 A1 * | 3/2005 | Glass et al. | ................. | 715/501.1 |
| 2006/0117228 A1 * | 6/2006 | Theimer | ........... | G06F 17/30985 714/45 |
| 2008/0249977 A1 | 10/2008 | Tsunemi et al. | | |
| 2008/2049977 | 10/2008 | Tsunemi et al. | | |
| 2010/0070512 A1 * | 3/2010 | Thurlow | ........... | G06F 17/30707 707/750 |
| 2011/0270851 A1 * | 11/2011 | Mishina | ............ | G06F 17/30982 707/749 |
| 2012/0158731 A1 * | 6/2012 | Gherman | .......... | G06F 17/30705 707/741 |

FOREIGN PATENT DOCUMENTS

| | | | |
|---|---|---|---|
| JP | 2008257444 | A | 10/2008 |
| JP | 2010256951 | A | 11/2010 |
| WO | 2009048149 | A | 4/2009 |

* cited by examiner

*Primary Examiner* — Robert Beausoliel, Jr.
*Assistant Examiner* — Nirav K Khakhar (57) ABSTRACT

Disclosed is a document similarity evaluation system or the like which can evaluate a degree of concentration and dispersion of parts with high similarity in at least two kinds of documents. The system includes a segment search unit which finds common segments (CS) in first and second segment strings, counts the number of CS, and identifies an appearance range (AR) within CS; and a similarity index (SI) calculation unit which calculates a first sum that is a sum of the numbers of characters of each segment (NCS) in AR and a second sum that is a sum of NCS of CS and calculates SI between the first and second segment strings by the following equation, SI=F(NTC)/G(NCC)×NS (where, NTC is the first sum, NCC is the second sum, NS is the number of the CS, functions F and G monotonically increase at larger than 0).

9 Claims, 5 Drawing Sheets

| SentenceA1 | 12 |
| --- | --- |
| SentenceA2 | 16 |
| SentenceA3 | 7 |
| SentenceA4 | 15 |
| SentenceA5 | 22 |
| SentenceB21 | 10 |
| SentenceB22 | 30 |

DOCUMENT SIMILARITY EVALUATION SYSTEM, DOCUMENT SIMILARITY EVALUATION METHOD, AND COMPUTER PROGRAM

This application is based upon and claims the benefit of priority from Japanese Patent Application No. 2012-008691, filed on Jan. 19, 2012, the disclosure of which is incorporated herein in its entirety by reference.

TECHNICAL FIELD

The present invention relates to a technical field of information processing for evaluating similarity between documents.

BACKGROUND ART

A method for evaluating similarity between different documents is widely used for evaluation of the similarity between scientific papers or detection of the similarity between corporate documents. Patent documents 1 to 3 disclose document similarity determination systems.

In a document similarity determination system disclosed in patent documents 1 to 2, first, an entire document is separated for each page or split at each position at which a particular character string appears (hereinafter, one separated (or split) unit is referred to as "segment") and a characteristic value is calculated for each segment. The similarity between different documents is determined based on the number of the segments whose characteristic values are equal to each other by comparing the characteristic values of the segments in order from the first to the last segment in the document. As a result of the determination, when the number of the segments whose characteristic values are equal to each other is large, the similarity between the documents is high and conversely, when the number of the segments whose characteristic values are equal to each other is small, the similarity between the documents is low.

In a document similarity determination system disclosed in patent document 3, a figure and an equation that exist in a document are separated from a sentence, a degree of congestion is defined with respect to the layout of the separated figure and equation, and the degree of congestion is used as an index for determining the similarity.

[Patent Document]
[patent document 1] Japanese Patent Application Laid-Open No. 2008-257444
[patent document 2] Japanese Patent Application Laid-Open No. 2010-256951
[patent document 3] International Publication No. WO 2009/048149

BRIEF SUMMARY OF THE INVENTION

Problems to be Solved by the Invention

The document similarity determination systems described in the above-mentioned patent documents can evaluate the similarity between the entire documents. However, these document similarity determination systems cannot evaluate whether parts with high similarity are concentrated in a certain paragraph or whether parts with high similarity are dispersed in the entire document.

SUMMARY

The present invention is made in view of the above-mentioned problems. A main object of the present invention is to provide a document similarity evaluation system or the like which determines a part with high similarity with respect to the similarity between at least two kinds of documents.

In order to achieve the object, the document similarity evaluation system according to the present invention is characterized by having the following configuration.

Namely, the document similarity evaluation system according to the present invention is characterized by including:

a segment search unit which finds common segments in both a first segment string and a second segment string, counts the number of the common segments that are found, and identifies an appearance range within which the above-mentioned common segments appear; and a similarity index calculation unit which calculates a first sum that is a sum of the numbers of characters of each segment included in the appearance range identified by the segment search unit, calculates a second sum that is a sum of the numbers of characters of each segment identified as the common segments, and calculates a similarity index indicating the similarity between the first segment string and the second segment string by using the following equation.

$$\text{similarity index} = F(NTC)/G(NCC) \times NS$$

(Where, in the above-mentioned equation,
NTC is the first sum,
NCC is the second sum,
NS is the number of the common segments, and
a function F and a function G are monotonically increasing functions by which a certain integer value is associated with a positive real value)

As another aspect of the present invention, a document similarity evaluation method according to the present invention is characterized by including:

finding common segments in both a first segment string and a second segment string;

counting the number of the common segments that are found;

identifying an appearance range within which the common segments appear;

calculating a first sum that is a sum of the numbers of characters of each segment included in the appearance range;

calculating a second sum that is a sum of the numbers of characters of each segment identified as the common segments; and calculating a similarity index indicating the similarity between the first segment string and the second segment string by the following equation.

$$\text{similarity index} = F(NTC)/G(NCC) \times NS$$

(Where, in the above-mentioned equation,
NTC is the first sum,
NCC is the second sum,
NS is the number of the common segments, and
a function F and a function G are monotonically increasing functions by which a certain integer value is associated with a positive real value)

Further, the object can also be achieved by using a computer program which causes a computer to realize a document similarity evaluation system having the above-mentioned configuration and a corresponding method and a computer-readable storage medium in which the computer program is stored.

By using the present invention, a part with high similarity can be determined with respect to the similarity between at least two kinds of documents.

BRIEF DESCRIPTION OF THE DRAWINGS

Exemplary features and advantages of the present invention will become apparent from the following detailed description when taken with the accompanying drawings in which.

EXEMPLARY EMBODIMENT

Next, an exemplary embodiment of the present invention will be described in detail with reference to the drawing.

In the following explanation, a segment is one separated or split unit that is obtained for example, by separating an entire document for each page or splitting it at each position at which a particular character string appears or splitting it by some length. A characteristic value is a value obtained by converting a particular character string such as a hash value, a CRC (cyclic redundancy check) value, a sum check value, or the like into a numerical value. With respect to a method of separating a document into segments and a method for calculating a characteristic value, various methods are known and widely used. Therefore, the explanation of these methods will be omitted in this exemplary embodiment. The method of separating a document into segments and the method for calculating a characteristic value are not limited to the method described in this exemplary embodiment as an example.

<First Exemplary Embodiment>

Figure 1:
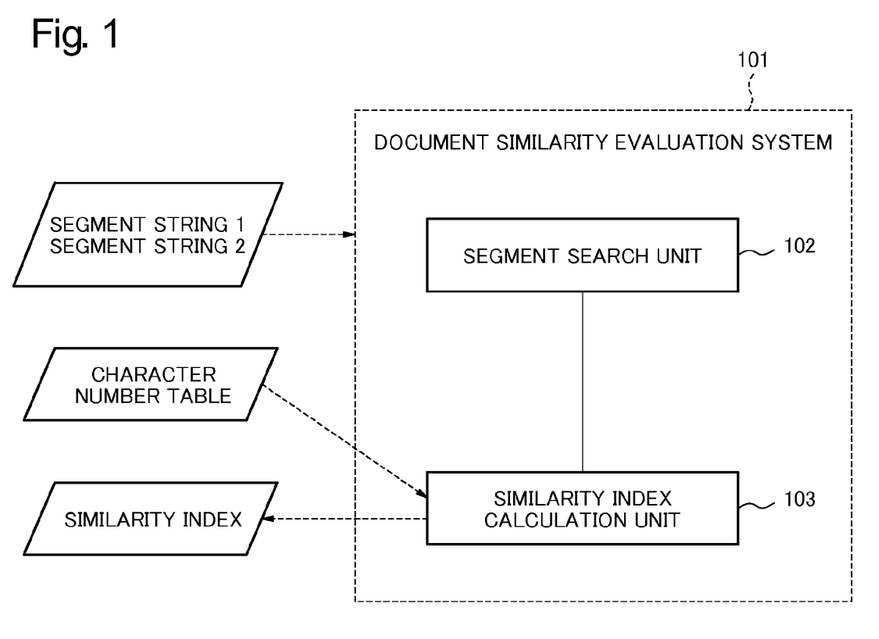
FIG. 1 is a block diagram showing a configuration of a document similarity evaluation system according to a first exemplary embodiment of the present invention.

FIG. 1 is a block diagram showing a configuration of a document similarity evaluation system according to a first exemplary embodiment of the present invention.

Referring to FIG. 1, a document similarity evaluation system 101 according to the exemplary embodiment includes a segment search unit 102 and a similarity index calculation unit 103.

A case in which the similarity between a document A and a document B is calculated will be described below. The segment search unit 102 receives a string 1 which represents a sequence of characteristic values of the segments relating to the document A (hereinafter, it is referred to as "segment string 1") and a string 2 which represents a sequence of characteristic values of the segments relating to the document B (hereinafter, it is referred to as "segment string 2") as an input. The segment search unit 102 finds the common segments in both the segment string 1 and the segment string 2 by performing a comparison between the segment string 1 and the segment string 2 in order from the first to the last segment or from the last to the first segment in the document that is an evaluation target. Next, the segment search unit 102 counts the number of the common segments that are found (hereinafter, described as NS) and identifies the first position of the common segments and the last position of the common segments (hereinafter, a range within which all the segments that exist between the first position and the last position are included is referred to as "an appearance range") in the segment string 2.

Figure 5:
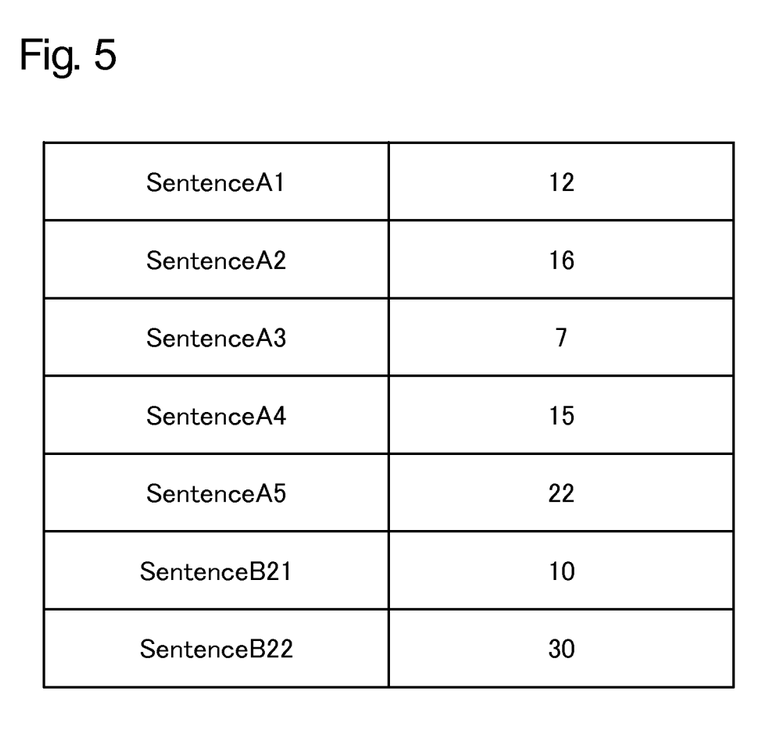
FIG. 5 is a drawing showing an example of a character number table in which a segment is associated with the number of characters included in the segment.

Next, the similarity index calculation unit 103 receives the segment string 2 received as the input, the above-mentioned appearance range, and the inputted character number table (character number information). In the character number table as the character number information, the segment which exists in the segment string 1 or the segment string 2 is associated with the number of characters that exist in its segment and these information are stored at least (FIG. 5). For example, in the character number table shown in FIG. 5, because a sentence A1 includes 12 characters, "A1" is associated with "12" and this information is stored. The similarity index calculation unit 103 reads the number of characters that is associated with the segment from the inputted character number table with respect to each segment included in the appearance range identified by the segment search unit 102 and calculates the sum (hereinafter, described as "NCC") of the numbers of the characters. Additionally, the similarity index calculation unit 103 reads the number of characters that is associated with the segment from the inputted character number table with respect to each segment identified as the common segment and calculates the sum (hereinafter, described as "NTC") of the numbers of the characters.

Next, the similarity index calculation unit 103 calculates the similarity index by using the following equation.

$$\text{similarity index} = F(NTC)/G(NCC) \times NS \qquad \text{(Equation 1)}$$

Here, both the function F and the function G are monotonically increasing functions by which a certain integer value is associated with a positive real value.

In the explanation of the configuration of the above-mentioned document similarity evaluation system, the document similarity evaluation system according to the exemplary embodiment identifies the appearance range to the segment string 2. However, it may identify the appearance range to the segment string 1.

Figure 2:
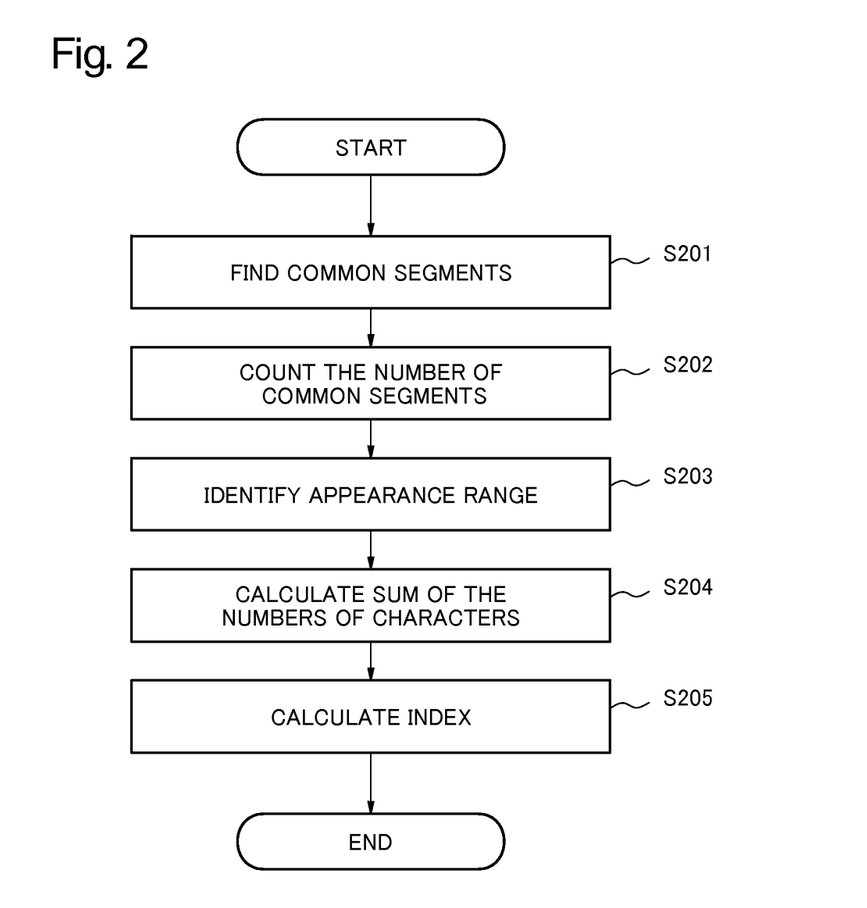
FIG. 2 is a flowchart showing a step of a process performed in a document similarity evaluation system according to a first exemplary embodiment of the present invention.

FIG. 2 is a flowchart showing a step of a process performed in the document similarity evaluation system according to the first exemplary embodiment of the present invention. Next, the operation of the document similarity evaluation system according to the exemplary embodiment will be described with reference to FIG. 1 and FIG. 2.

The segment search unit 102 receives the segment string 1 representing the document A and the segment string 2 representing the document B as the input. The segment search unit 102 finds common segments in both the segment string 1 and the segment string 2 in order from the first to the last segment in the segment string (step S201). Next, the segment search unit 102 counts the number of the common segments that are found in step S201 (step S202) and identifies the appearance range in the segment string 2 (step S203).

Next, the similarity index calculation unit 103 receives the inputted segment string 2, the above-mentioned appearance range, and the inputted character number table. The similarity index calculation unit 103 reads the number of characters that is associated with the segment from the inputted character number table with respect to each segment included in the appearance range identified by the segment search unit 102 and calculates NCC that is the sum of the numbers of the characters. Next, the similarity index calculation unit 103 reads the number of characters that is associated with the segment from the inputted character number table with respect to each segment identified as the common segments and calculates NTC that is the sum of the numbers of characters (step S204). Next, the similarity index calculation unit 103 calculates the similarity index by using the equation 1 (step S205).

In the above-described explanation of the step of the process, the document similarity evaluation system according to the exemplary embodiment identifies the appearance range to the segment string 2. However, it may identify the appearance range to the segment string 1.

The document similarity determination system disclosed in patent document 1 employs NS as the similarity index. On the other hand, the document similarity evaluation system according to the exemplary embodiment employs a value obtained by multiplying NS by a ratio of the function F(NTC) to the function G(NCC). Here, both the function F and the function G are monotonically increasing functions by which a certain integer value is associated with a positive real value. Therefore, when the common segments appear densely, the value of F(NTC)/G(NCC) is large and conversely, when the common segments are dispersed, the value of F(NTC)/G(NCC) is small. Even in a case in which the same values are calculated for the similarity index by the document similarity determination system disclosed in patent document 1, if the document similarity evaluation system according to the exemplary embodiment is used, there is a high possibility that the different values are calculated for the similarity index according to a degree of concentration and dispersion of the common segments.

Figure 4:
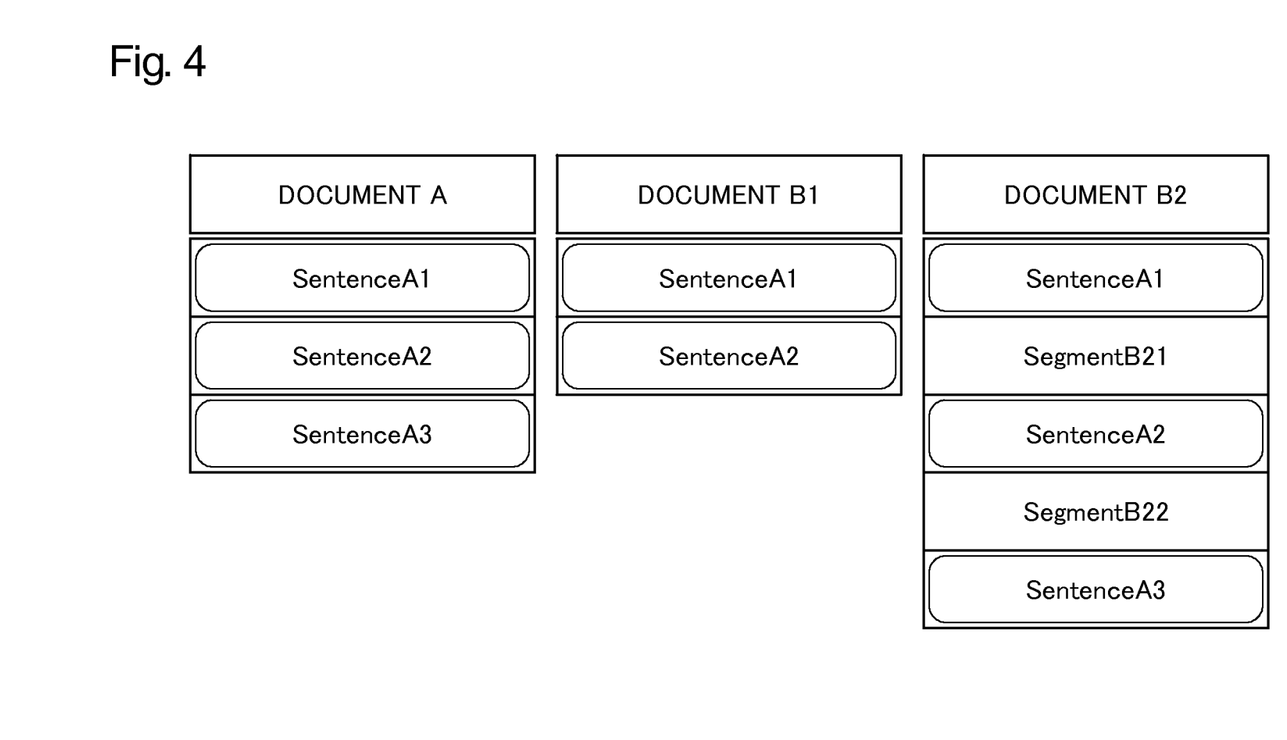
FIG. 4 is a drawing showing an example for explaining a step of a process performed in the document similarity evaluation system according to a first exemplary embodiment of the present invention.

FIG. 4 is a figure showing an example for explaining the step of the process performed in the document similarity evaluation system according to the first exemplary embodiment of the present invention. Next, the operation of the document similarity evaluation system according to the exemplary embodiment will be described with reference to FIG. 1, FIG. 2, and FIG. 4.

As shown in FIG. 4, a document A, a document B1, and a document B2 are composed of sentences representing the segments, such as a sentence A1, a sentence A2, a sentence A3, a sentence B21, and a sentence B22. Hereinafter, the sentence A1, the sentence A2, and the like are described as "A1", "A2", and the like by omitting the word "sentence". Namely, the document A is composed of the segment string including A1, A2, and A3, the document B1 is composed of the segment string including A1 and A2, and the document B2 is composed of the segment string including A1, B21, A2, B22, and A3. Here, for ease of explanation, it is assumed that all the segments A1, A2, A3, B21, and B22 include the same number of characters and the number of characters is N. The function F and the function G of the similarity index calculation unit 103 output the inputted value without changing it.

The operation, in a case that the segment strings representing the document A and the document B1 are inputted, will be described. The segment search unit 102 finds common segments in both the segment string representing the document A and the segment string representing the document B1 (step S201) and finds that the segments A1 and A2 are the common segments in these two documents. Next, the segment search unit 102 counts the number of the common segments (step S202) and finds that the number of the common segments is 2. Next, the segment search unit 102 identifies the appearance range in the segment string representing the document B1 (step S203) and identifies that the appearance range includes the segments A1 and A2.

The similarity index calculation unit 103 reads the number of characters that is associated with the segment from the inputted character number table with respect to each segment included in the appearance range identified by the segment search unit 102 and calculates the sum of the numbers of characters of each segment included in the appearance range. In this case, NCC is 2×N. Next, the similarity index calculation unit 103 reads the number of characters that is associated with the segment from the inputted character number table with respect to each segment identified as the common segments and calculates NTC that is the sum of the numbers of characters (step S204). In this case, NTC is 2×N. The similarity index calculation unit 103 calculates the index by using the above-mentioned equation 1 and obtains 2 (=2N/2N×2) as the index.

Next, the operation in a case in which the segment string representing the document A and the segment string representing the document B2 are inputted will be described. The segment search unit 102 finds common segments in both the segment string representing the document A and the segment string representing the document B2 (step S201) and finds that the segments A1, A2, and A3 are the common segments in these two documents. Next, the segment search unit 102 counts the number of the common segments (step S202) and finds that the number of the common segments is 3. Next, the segment search unit 102 identifies the appearance ranges in the segment string representing the document B2 (step S203) and identifies that the appearance range includes the segments A1, B21, A2, B22, and A3.

The similarity index calculation unit 103 reads the number of characters that is associated with the segment from the inputted character number table with respect to each segment included in the appearance range identified by the segment search unit 102 and calculates the sum of the numbers of characters of each segment included in the appearance range. In this case, NCC is 5×N. Next, the similarity index calculation unit 103 reads the number of characters that is associated with the segment from the inputted character number table with respect to each segment identified as the common segments and calculates NTC that is the sum of the numbers of characters (step S204). In this case, NTC is 3×N. The similarity index calculation unit 103 calculates the index by using the above-mentioned equation 1 and obtains 1.8 (=3N/5N×3) as the index.

The similarity index calculated by the document similarity evaluation system according to the exemplary embodiment is 2 with respect to the document A and the document B1 and it is 1.8 with respect to the document A and the document B2. Accordingly, the system according to the exemplary embodiment determines that the document B1 is similar to the documents A by comparing the two calculated similarity indexes.

However, when the document similarity determination system disclosed in patent document 1 is used, the similarity index of 2 is obtained with respect to the document A and the document B1 and the similarity index of 3 is obtained with respect to the document A and the document B2. Accordingly, the document similarity determination system disclosed in patent document 1 determines that the document B2 is similar to the document A based on the calculated similarity indexes. In FIG. 4, it is clear that the common segments are dispersed in the document B2 compared to the document B1. Therefore, the value calculated by the system according to the present invention is smaller than the value calculated by the document similarity determination system disclosed in patent document 1. Therefore, the document similarity evaluation system according to the exemplary embodiment can provide the index by which the degree of concentration and dispersion of parts with high similarity in the document can be involved in the evaluation.

In the explanation described above, for simplification of the explanation, it is assumed that all the segments A1, A2, A3, B21, and B22 include the same number of characters. However, even when a system configuration (a configuration of a process) in which the number of characters included in each segment is different from each other is used, the effect obtained by this exemplary embodiment can be maintained. Similarly, in the explanation described above, it is assumed that the function F and the function G of the similarity index calculation unit 103 output the inputted value without changing it. However, as long as the function F and the function G are monotonically increasing functions by which a certain integer value is associated with a positive real value, the order relation is not reversed. Therefore, the effect obtained by this exemplary embodiment is maintained.

Namely, by this exemplary embodiment, the document similarity evaluation system which can evaluate the degree of concentration and dispersion of parts with high similarity in at least two kinds of documents can be provided.

<Second Exemplary Embodiment>

Next, a second exemplary embodiment based on the first exemplary embodiment described above will be described.

In the following description, the explanation will be focused on a characteristic part of this exemplary embodiment and the explanation of a configuration that is the same as that of the first exemplary embodiment mentioned above is omitted.

A document similarity evaluation system according to the second exemplary embodiment will be described with reference to FIG. 1. After the segment search unit 102 calculates NCC and NTC, the similarity index calculation unit 103 calculates the similarity index with respect to the inputted segment strings 1 and 2 by using the following equation 2.

$$\text{similarity index} = H(NTC/NCC) \times NS \quad \text{(Equation 2)}$$

Here, a function H is a monotonically increasing function by which a certain real value is associated with a positive real value.

The document similarity evaluation system according to the exemplary embodiment employs the similarity index obtained by multiplying NS by H(NTC/NCC). The function H is a monotonically increasing function by which a certain real value is associated with a positive real value. Therefore, when the common segments are concentrated, the value of H(NTC/NCC) is large and conversely, when the common segments are dispersed, the value of H(NTC/NCC) is small. Therefore, even in a case in which the same values are calculated for the similarity index by the document similarity determination system disclosed in patent document 1, if the document similarity evaluation system according to the exemplary embodiment is used, there is a high possibility that the different values are calculated for the similarity index according to a degree of concentration and dispersion of the common segments.

Namely, by this exemplary embodiment, the document similarity evaluation system which can evaluate the degree of concentration and dispersion of parts with high similarity in at least two kinds of documents can be provided.

<Third Exemplary Embodiment>

Next, a third exemplary embodiment based on the first exemplary embodiment mentioned above will be described.

In the following description, the explanation will be focused on a characteristic part of this exemplary embodiment and the explanation of a configuration that is the same as that of the first exemplary embodiment mentioned above is omitted.

A document similarity evaluation system according to the third exemplary embodiment will be described with reference to FIG. 1. After the segment search unit 102 calculates NCC and NTC, the similarity index calculation unit 103 calculates the similarity index with respect to the inputted segment strings 1 and 2 by using the following equation 3.

$$\text{similarity index} = NTC/NCC \times NS \quad \text{(Equation 3)}$$

The document similarity evaluation system according to the exemplary embodiment employs the similarity index obtained by multiplying NS by a ratio of NTC to NCC. When the common segments are concentrated, the value of NTC/NCC is large and conversely, when the common segments are dispersed, the value of NTC/NCC is small. Therefore, even in a case in which the same values are calculated for the similarity index by the document similarity determination system disclosed in patent document 1, if the document similarity evaluation system according to the exemplary embodiment is used, there is a high possibility that the different values are calculated for the similarity index according to a degree of concentration and dispersion of the common segments.

Namely, by this exemplary embodiment, the document similarity evaluation system which can evaluate the degree of concentration and dispersion of parts with high similarity in at least two kinds of documents can be provided.

(Example of Hardware Configuration)

Next, an example of a configuration of the hardware resources in which the document similarity evaluation system described in each exemplary embodiment mentioned above is realized by using one computer processing apparatus (an information processing device or a computer) will be described. However, the document similarity evaluation system may be realized by using at least two computer processing apparatuses physically or functionally. Further, the document similarity evaluation system may be realized as a dedicated device.

Figure 3:
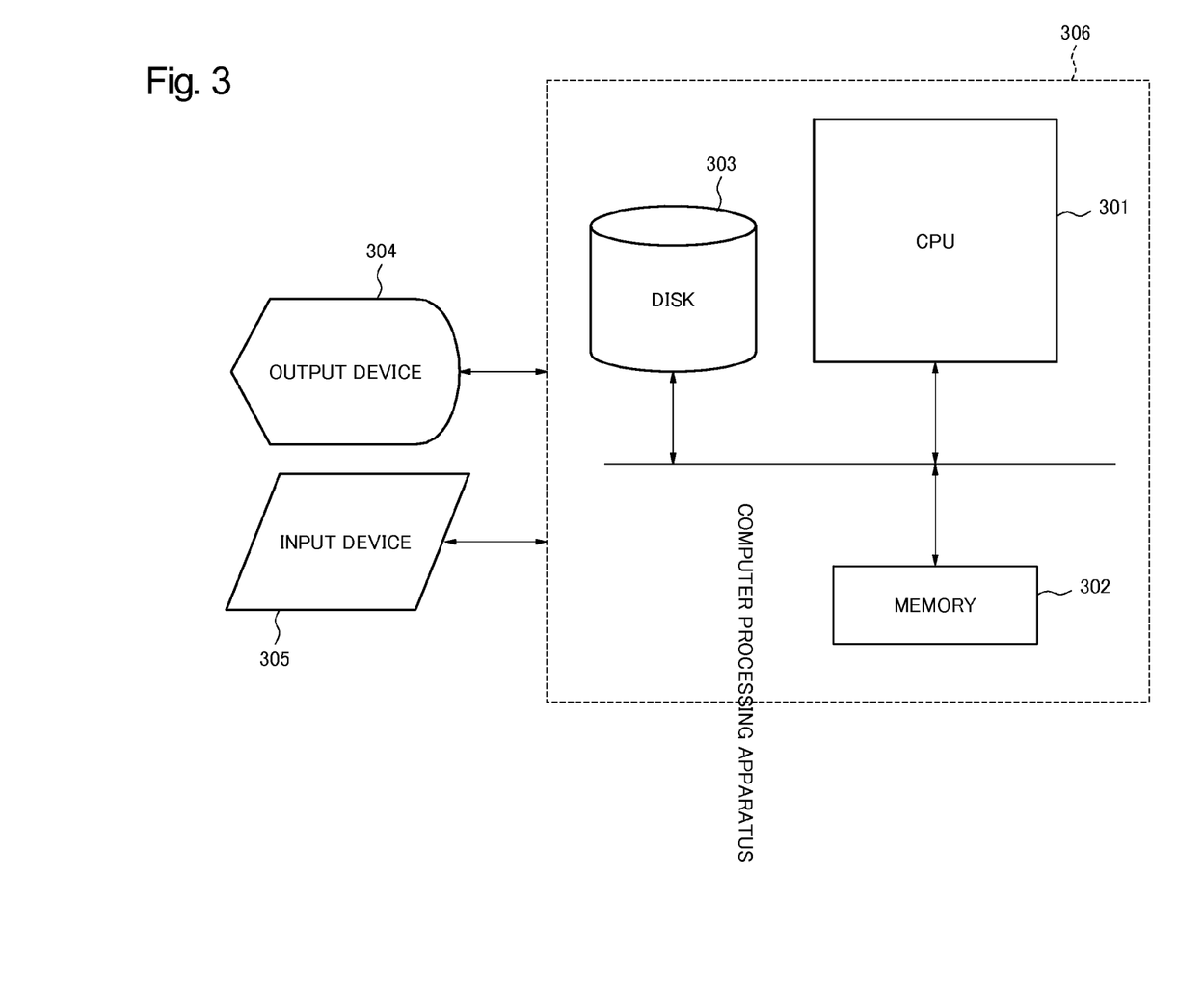
FIG. 3 is a drawing schematically showing a hardware configuration of a computer processing apparatus by which a document similarity evaluation system according to an exemplary embodiment can be realized.

FIG. 3 is a figure schematically showing a hardware configuration of the computer processing apparatus by which the document similarity evaluation system according to the first to third exemplary embodiments of the present invention can be realized. A computer processing apparatus 306 includes a CPU (Central Processing Unit) 301, a memory 302, a disk 303, an output device 304, and an input device 305.

Namely, the CPU 301 copies a software program (computer program: hereinafter, simply referred to as program) stored in the disk 303 in the memory 302 when the program is executed and performs the arithmetic processing. The CPU 301 reads data required to execute the program from the memory 302. When displaying is needed, the CPU 301 displays an output result in the output device 304. When the program is inputted from the outside, the CPU 301 reads the program from the input device 305. The CPU 301 interprets the document similarity evaluation program in the memory 302 and executes the program. The CPU 301 sequentially performs the processes according to the flowchart (FIG. 2) and the equations that are referred to in each exemplary embodiment mentioned above. In such case, it is considered that the present invention is composed of a code of which the computer program is composed or a computer-readable storage medium storing the code.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. A computer-implemented apparatus evaluating document similarity comprising:
   a processor; and
   a memory capable of storing instructions to be executed by the processor by causing the processor to execute:
   a segment search unit implemented by hardware including the processor and the memory and which finds common segments in both a first segment string and a second segment string, counts the number of the common segments that are found, and identifies an appearance range within which the common segments appear; and
   a similarity index calculation unit implemented by the hardware and which calculates a second sum that is a sum of the numbers of characters of each segment included in the appearance range identified by the segment search unit, calculates a first sum that is a sum of the numbers of characters of each segment identified as the common segments, and calculates the similarity index indicating the similarity between the first segment string and the second segment string by using the following equation, similarity index=F(NTC)/G(NCC)×NS (Where, in the above-mentioned equation,
   NTC is the first sum,
   NCC is the second sum,
   NS is the number of the common segments, and
   a function F and a function G are monotonically increasing functions by which a certain integer value is associated with a positive real value).

2. The document similarity evaluation system according to claim 1,
   wherein
   the similarity index calculation unit calculates the first sum and the second sum based on a character number information in which each segment included in the appearance range is associated with the number of characters included in the each segment.

3. The document similarity evaluation system according to claim 1,
   wherein the similarity index calculation unit calculates the similarity index indicating the similarity between the first segment string and the second segment string by using the following equation, similarity index=H(NTC/NCC)×NS, (Where, in the above-mentioned equation,
   NTC is the first sum,
   NCC is the second sum,
   NS is the number of the common segments, and
   a function H is a monotonically increasing function by which a certain integer value is associated With a positive real value).

4. The document similarity evaluation system according to claim 1,
   Wherein the similarity index calculation unit calculates the similarity index indicating the similarity between the first segment string and the second segment string by using the following equation, similarity index=NTC/NCC×NS (Where, in the above-mentioned equation,
   NTC is the first sum,
   NCC is the second sum, and
   NS is the number of the common segments).

5. A document similarity evaluation method calculating a similarity index indicating a similarity between a first segment string and a second segment string comprising:
   finding common segments in both the first segment string and the second segment string,
   counting the number of the common segments that are found;
   identifying an appearance range within which the common segments appear;
   calculating a second sum that is a sum of the numbers of characters of each segment included in the appearance range;
   calculating a first sum that is a sum of the numbers of characters of each segment identified as the common segments; and
   calculating the similarity index by the following equation, similarity index=F(NTC)/G(NCC) x NS (Where, in the above-mentioned equation,
   NTC is the first sum,
   NCC is the second sum,
   NS is the number of the common segments, and
   a function F and a function G are monotonically increasing functions by which a certain integer value is associated with a positive real value).

6. The document similarity evaluation method according to claim 5,
   Wherein the calculation of the similarity index indicating the similarity is performed by using the following equation, similarity index=H(NTC/NCC)×NS (Where, in the above-mentioned equation,
   NTC is the first sum,
   NCC is the second sum,
   NS is the number of the common segments, and a function H is a monotonically increasing function by which a certain integer value is associated with a positive real value).

7. The document similarity evaluation method according to claim 5,
   Wherein the calculation of the similarity index indicating the similarity is performed by using the following equation, similarity index=NTC/NCC×NS (Where, in the above-mentioned equation,
   NTC is the first sum,
   NCC is the second sum, and
   NS is the number of the common segments).

8. A computer-implemented apparatus evaluating a similarity comprising:
   a processor; and
   a memory capable of storing instructions to be executed by the processor by causing the processor to execute:
   a similarity index calculation unit which calculates a similarity index indicating the similarity between a first segment string and a second segment on the basis of
   (i) a ratio of
   the number of characters included in an first appearance range, which is a range where common segments in the first segment string and the second segment string appear in the second segment string, to
   a result of multiplying the number of appearance of the common segments in the first appearance range and the number of characters of the common segments, and
   (ii) the number of the common segments.

9. The computer-implemented apparatus according to claim 8, wherein,
  when the ratio calculated in case of the first segment string and the second segment is the same to the ratio calculated in case of the first segment string and a third segment string, the similarity index calculation unit determines which segment string is more similar to the first segment string by comparing
  the number of common segments in the first segment string and the second segment string with
  the number of common segments in the first segment string and the third segment string.

* * * * *